United States Patent [19]

Partan, III

[11] Patent Number: 5,504,123

[45] Date of Patent: Apr. 2, 1996

[54] DUAL FUNCTIONAL CELLULOSIC ADDITIVES FOR LATEX COMPOSITIONS

[75] Inventor: Emmett M. Partan, III, Bound Brook, N.J.

[73] Assignee: Union Carbide Chemicals & Plastics Technology Corporation, Danbury, Conn.

[21] Appl. No.: 359,558

[22] Filed: Dec. 20, 1994

[51] Int. Cl.$^6$ .................................................. C08L 1/28
[52] U.S. Cl. ................................ 524/42; 524/43; 524/44; 524/45; 524/46
[58] Field of Search .................................. 524/42, 43, 44, 524/45, 46

[56] References Cited

U.S. PATENT DOCUMENTS

| | | | |
|---|---|---|---|
| Re. 34,904 | 4/1995 | Just et al. | 524/43 |
| T976,002 | 11/1978 | Vanderslice | 424/49 |
| 1,451,331 | 4/1923 | Dreyfus | 536/90 |
| 1,483,738 | 2/1924 | Lilienfeld | 536/89 |
| 1,502,379 | 7/1924 | Dreyfus | 536/95 |
| 1,683,682 | 9/1928 | Lilienfeld | 536/100 |
| 1,683,831 | 9/1928 | Lilienfeld | 536/100 |
| 1,867,050 | 7/1932 | Balle et al. | 536/90 |
| 1,877,856 | 9/1932 | Hagedorn et al. | 536/91 |
| 2,067,853 | 1/1937 | Lorand | 536/94 |
| 2,071,287 | 2/1937 | Lorand | 536/94 |
| 2,077,066 | 4/1937 | Lorand | 536/94 |
| 2,087,549 | 7/1937 | Powers et al. | 536/93 |
| 2,096,114 | 10/1937 | Lorand | 536/88 |
| 2,098,335 | 11/1937 | Dreyfus | 536/66 |
| 2,101,032 | 12/1937 | Lorand | 536/85 |
| 2,102,205 | 12/1937 | Hakins et al. | 536/90 |
| 2,119,171 | 5/1938 | Lorand | 536/94 |
| 2,201,663 | 9/1939 | Ellsworth et al. | 536/60 |
| 2,205,487 | 6/1940 | Meinel et al. | 536/94 |
| 2,284,282 | 5/1942 | Hentrich et al. | 536/94 |
| 2,383,361 | 5/1943 | Bass et al. | 536/87 |
| 3,102,912 | 9/1963 | Neracher et al. | 252/8.8 |
| 3,941,751 | 3/1976 | Breslow | 525/333.9 |
| 3,971,627 | 7/1976 | Breslow | 536/85 |
| 4,009,329 | 2/1977 | Arney et al. | 536/84 |
| 4,065,319 | 12/1977 | Desmarais | 524/4 |
| 4,076,930 | 2/1978 | Ellingboe et al. | 536/120 |
| 4,084,060 | 4/1978 | Glass, Jr. et al. | 536/96 |
| 4,097,667 | 6/1978 | Holst et al. | 536/87 |
| 4,127,495 | 11/1978 | Swinson | 252/174.17 |
| 4,228,277 | 10/1980 | Landoll | 536/90 |
| 4,243,802 | 1/1981 | Landoll | 536/91 |
| 4,281,110 | 7/1981 | Blount | 536/84 |
| 4,286,964 | 9/1981 | Seed | 536/85 |
| 4,465,517 | 8/1984 | Shields | 106/35 |
| 4,485,089 | 11/1984 | Leipold | 424/49 |
| 4,485,211 | 11/1984 | Okamoto | 525/57 |
| 4,529,523 | 7/1985 | Landoll | 507/261 |
| 4,579,667 | 4/1986 | Echt et al. | 523/130 |
| 4,584,189 | 4/1986 | Leipold | 424/54 |
| 4,604,217 | 8/1986 | Lukach et al. | 523/130 |
| 4,650,863 | 3/1987 | Felcht et al. | 536/90 |
| 4,663,159 | 5/1987 | Brode, II et al. | 536/90 |
| 4,683,004 | 7/1987 | Goddard | 106/170 |

(List continued on next page.)

FOREIGN PATENT DOCUMENTS

| | | |
|---|---|---|
| 0161607 | 1/1985 | European Pat. Off. . |
| 0140486 | 6/1985 | European Pat. Off. . |
| 0281951 | 3/1988 | European Pat. Off. . |
| 0290771 | 4/1988 | European Pat. Off. . |
| 0297553 | 2/1989 | European Pat. Off. . |
| 0384167 | 1/1990 | European Pat. Off. . |
| 0357962 | 1/1990 | European Pat. Off. . |
| 0808699 | 11/1937 | France . |
| 1604236 | 12/1968 | France . |
| 0492062 | 3/1930 | Germany . |
| 0494917 | 8/1930 | Germany . |
| 0554877 | 2/1932 | Germany . |
| 3147434 | 7/1983 | Germany . |
| 0341805 | 7/1959 | Switzerland . |
| 0925971 | 5/1982 | U.S.S.R. ........... 524/46 |
| 0325512 | 3/1930 | United Kingdom . |
| 0305946 | 11/1930 | United Kingdom . |
| 0346426 | 8/1931 | United Kingdom . |
| 1242735 | 4/1971 | United Kingdom . |
| 1228850 | 6/1971 | United Kingdom . |
| 2053225 | 1/1981 | United Kingdom . |
| 2146320 | 6/1985 | United Kingdom . |

OTHER PUBLICATIONS

Japanese Patent Abstract 60–136522(A) of Daicel Kagaku Kogyo K.K., by Tooru Shibata.

Research Disclosure 25221, "Elevation of Viscosity of Addition of Alcohol to Hydrophobically Modified Hydroxyethylcellulose/Surfactant Solutions", Apr. 1985.

Research Disclosure 25202, "Substantivity to Hair of Hydrophobically–Modified Hydroxyethylcellulose", Apr. 1985.

Research Disclosure 28865, "Sustained Release Matrix Dosage Forms Incorporating Fine Particle Size Hydroxyethylcellulose", Apr. 1988.

Research Disclosure 306101, "Klucel® Hydroxypropylcellulose Dry Tablet Biners", Oct. 1989 Synthesis, Feb. 1983, pp. 117–119.

English Language Derwent Abstract for European Patent Publication No. 0 161 607.

Ser. No. 07/304,258–filed Jan. 31, 1989 (D–15741) and Ser. No. 964,896–filed Oct. 22, 1992 (D–15741–1).

*Primary Examiner*—Peter A. Szekely
*Attorney, Agent, or Firm*—W. K. Volles

[57] ABSTRACT

Cellulose ether derivatives comprising a hydrophobic substituent having an unsaturated alkyl portion are disclosed. The unsaturation in the alkyl portion of the hydrophobic substituent can promote crosslinking of the cellulose ether derivative. The cellulose ether derivatives are useful as ingredients in latex compositions. The cellulose ether derivatives can provide associative thickening and rheological properties to latex composition during storage and application. In addition, after the latex composition is applied to the surface to be coated, the cellulose ethers of the present invention can promote crosslinking of the latex film to provide a hard and durable coating. Latex paint compositions comprising the cellulose ether derivatives of the present invention are also disclosed.

16 Claims, No Drawings

U.S. PATENT DOCUMENTS

| | | | |
|---|---|---|---|
| 4,684,704 | 8/1987 | Craig | 526/200 |
| 4,703,116 | 10/1987 | Solarek et al. | 536/104 |
| 4,731,162 | 3/1988 | Solarek et al. | 536/84 |
| 4,734,454 | 3/1988 | Aihara et al. | 524/555 |
| 4,743,384 | 5/1988 | Lu et al. | 507/110 |
| 4,784,693 | 11/1988 | Kirkland et al. | 106/805 |
| 4,799,962 | 1/1989 | Ahmed | 524/44 |
| 4,841,040 | 6/1989 | Just et al. | 524/49 |
| 4,845,175 | 7/1989 | Lo | 526/200 |
| 4,845,207 | 7/1989 | Tsas | 536/91 |
| 4,853,437 | 8/1989 | Lukach et al. | 523/411 |
| 4,868,238 | 9/1989 | Craig | 524/457 |
| 4,883,536 | 11/1989 | Burdick | 524/401 |
| 4,883,537 | 11/1989 | Burdick | 106/194 |
| 4,883,850 | 11/1989 | Craig | 526/200 |
| 4,892,589 | 1/1990 | Kirkland et al. | 526/200 |
| 4,902,733 | 2/1990 | Angerer | 524/44 |
| 4,904,772 | 2/1990 | Sau | 536/90 |
| 4,954,270 | 9/1990 | Butterworth et al. | 252/8.8 |
| 4,981,959 | 1/1991 | Diamantoglou | 536/90 |
| 4,981,960 | 1/1991 | Diamantoglou | 536/90 |
| 4,994,112 | 2/1991 | Majewicz et al. | 106/169 |
| 4,997,935 | 3/1991 | Diamantoglou | 536/90 |
| 5,002,985 | 3/1991 | Andersson et al. | 524/44 |
| 5,100,658 | 3/1992 | Bolich, Jr. et al. | 514/781 |
| 5,106,609 | 4/1992 | Bolich, Jr. et al. | 8/405 |
| 5,120,838 | 6/1992 | Just et al. | 536/90 |
| 5,124,445 | 6/1992 | Just et al. | 536/84 |
| 5,140,099 | 8/1992 | Bostrom et al. | 524/42 |
| 5,376,709 | 12/1994 | Lau et al. | 524/44 |

5,504,123

DUAL FUNCTIONAL CELLULOSIC ADDITIVES FOR LATEX COMPOSITIONS

FIELD OF THE INVENTION

The present invention relates to cellulosic polymers comprising hydrophobic substituents having an alkyl portion which is partially unsaturated. More specifically, the present invention relates to crosslinkable cellulose ether derivatives which are useful, for example, as additives in latex compositions.

BACKGROUND ON THE INVENTION

Hydrophobe-modified, water-soluble polymers, e.g., hydrophobically modified cellulose ethers, have found extensive use in the latex paint industry as additives to provide associative thickening and rheology modification. Associative thickening can be described as a thickening mechanism whereby the hydrophobic substituents of the polymer molecules interact with each other to provide desirable thickening characteristics such as high viscosity at low shear. In many cases, the hydrophobic substituents of the polymers can affect the rheology of the latex composition providing enhanced flow and leveling properties. Typical hydrophobic substituents used to derivatize polymers such as cellulose ethers include long chain alkyl epoxides, e.g., 1,2-epoxyhexadecane and glycidyl ethers with long alkyl chains, e.g., nonylphenyl glycidyl ether. Thus, the hydrophobe-modified, water- soluble polymers are desirable additives in latex compositions.

In contrast to latex compositions, oil-based compositions, e.g., oil-based paints, commonly employ vegetable oils such as linseed oil or tung oil as a component of the vehicle in the paint. These vegetable oils, which are also referred to in the art as "drying oils", form crosslinked films upon exposure to air. Like all vegetable oils, these drying oils are triesters of various fatty acids and glycerol. However, unlike most vegetable oils, the fatty acids in drying oils typically comprise three unsaturated fatty acids: oleic (9-cis-octadecenoic); linoleic (9-cis-12-cis-octadecenoic) and linolenic (9-cis-12-cis-15-cis-octadecenoic) acids. The use of such crosslinkable drying oils in oil based paints helps to provide a paint film which is hard and durable. Thus, the drying oils are desirable components of oil-based compositions. However, oil based compositions typically comprise large proportions of volatile organic compounds ("VOC's") e.g., 380 to 450 grams per liter ("g/l") or more. Such high concentrations of VOC's are environmentally undesirable.

Latex compositions, on the other hand, typically comprise very low concentrations of VOC's, e.g. less than about 250 g/l and thus are more environmentally compatible. Accordingly, it would be desirable to incorporate the drying oils of oil-based compositions into latex compositions to promote crosslinking of the latex compositions. However, the drying oils used in oil-based compositions are not water-soluble and accordingly cannot readily be used in latex compositions. Also, the unsaturated fatty acids which comprise the drying oils are not readily convertible to a chemical form which can be reacted with cellulose ether to provide hydrophobe modification.

Accordingly, hydrophobe-modified cellulose ether derivatives are desired which can provide associative thickening and rheological modification properties to latex compositions for the purposes of storage and application of the latex to a surface to be coated, and which can also promote crosslinking of the latex composition upon exposure to oxygen after the composition has been applied to the surface to be coated.

SUMMARY OF THE INVENTION

By the present invention, dual functional cellulose ether derivatives are provided. The cellulose ethers of the present invention comprise a hydrophobic substituent having a partially unsaturated alkyl portion. Unsaturation in the alkyl portion of the hydrophobic substituent can promote crosslinking between molecules of the hydrophobically modified cellulose ether upon exposure to oxygen, e.g., air.

The cellulose ether derivatives of the present invention are particularly useful as additives in latex compositions. First, the cellulose ether derivatives function as additives and rheology modifiers which provide beneficial properties to the latex composition during storage and application. Second, the cellulose ether derivatives function to promote crosslinking of a film of the latex composition upon exposure to oxygen after the film is applied to the surface to be coated. Hence, the cellulose ether derivatives of the present invention have dual functionality in latex compositions. As a result, latex compositions which comprise cellulose ether derivatives of the present invention can provide coatings which have hardness and durability properties similar to those obtained with oil-based coatings without the deleterious environmental characteristics, e.g. high VOC content, of oil based compositions.

DETAILED DESCRIPTION OF THE INVENTION

Cellulose ethers suitable for use in accordance with the present invention include etherified derivatives of cellulose. Typical cellulose ethers include for example, hydroxyethyl cellulose, hydroxypropyl cellulose, methyl cellulose, hydroxypropyl methyl cellulose, hydroxyethyl methyl cellulose, hydroxyethyl carboxylmethyl cellulose, and the like. Preferred cellulose ethers include hydroxyethyl cellulose and ethyl hydroxyethyl cellulose.

Ether substituents suitable for use in accordance with the present invention comprise ethers having 2 to 4 carbon atoms per molecule. Typically, the ether substituent is derivatized onto the cellulose by reacting the cellulose with an alkylene oxide, preferably ethylene oxide. The amount of ether substitution is typically from about 1.5 to 6 and preferably from about 3 to 5 moles of ether substituent per mole of cellulose ether. Further details concerning the manufacture of such cellulose ethers are known to those skilled in the art. Moreover, such cellulose ethers are readily commercially available from, for example, Union Carbide Corporation, Danbury, Conn.

The molecular weight of the cellulose ethers suitable for use in accordance with the present invention typically ranges from about 10,000 to 500,000 grams per gram mole and preferably ranges from about 20,000 to 200,000 grams per gram mole. As used herein, the term "molecular weight" means weight average molecular weight. Methods for determining weight average molecular weight of cellulose ethers are known to those skilled in the art. One preferred method for determining molecular weight is low angle laser light scattering. The viscosity of the cellulose ethers typically ranges from about 5 to 5000 centipoise, preferably from about 10 to 250 centipoise. Unless otherwise indicated, as used herein the term "viscosity" refers to the viscosity of a 1.0 weight percent aqueous solution of the polymer measured at 25° C. with a Brookfield viscometer. Such viscosity measuring techniques are known in the art and are described in ASTM D 2364-89.

Hydrophobic substituents suitable for use in accordance with the present invention comprise an alkyl portion having from about 4 to 20 carbon atoms, preferably from about 4 to 18 carbon atoms. The structure of the hydrophobic substituent can be alkyl or alkyl-aryl. As used herein the term "alkyl-aryl" means a group containing both aromatic and aliphatic structures. As used herein, the term "alkyl" means a group containing aliphatic structures, preferably straight chain. Hydrophobic substituents which are alkyl in structure preferably have from about 12 to 24 carbon atoms. Hydrophobic substituents which are alkyl-aryl in structure preferably have 6 or 12 carbon atoms in the aryl portion and about 4 to 20 carbon atoms in the alkyl portion.

In order to promote crosslinking, the alkyl portion of the hydrophobic substituent is preferably polyunsaturated. Typically, the alkyl portion of the hydrophobic substituent is either di-unsaturated or tri-unsaturated. Typically, the hydrophobic substituents suitable for use in accordance with the present invention will comprise a distribution of saturated isomers, mono-unsaturated isomers, di-unsaturated isomers and tri-unsaturated isomers. Preferably, the alkyl portion of the hydrophobic substituent comprises two unsaturated-carbon-carbon bonds which are separated by at least one saturated carbon atom, e.g., allylic double bonds.

The hydrophobic substituents can be derivatized on to the cellulose ethers by reacting suitable compounds such as glycidyl ethers, epoxides, urethanes or halides which comprise the hydrophobic substituent with the cellulose ether. Glycidyl ethers are preferred compounds for use in accordance with the present invention. Preferably, the compounds used for derivatizing the cellulose ethers with the hydrophobic substitutents of the present invention are substantially free, i.e., contain less than one weight percent on average, of urethane radicals. Methods for derivatizing cellulose ethers to comprise hydrophobic substituents are known to those skilled in the art. Note for example, U.S. Pat. No. 4,228,277 issued Oct. 14, 1980, U.S. Pat. No. 4,663,159 issued May 5, 1987 and U.S. Pat. No. 5,124,445 issued Jun. 23, 1992.

Preferably, the hydrophobic substituents of the present invention are unsaturated alkyl phenolics having from about 10 to 26 carbon atoms per molecule. A preferred hydrophobic substituent is 3-n-pentadecenyl phenyl. Preferred hydrophobe containing reagents suitable for use as hydrophobic substituents are selected from the group consisting of 3-n-pentadecenyl phenol glycidyl ether, and other glycidyl ethers prepared from naturally occurring unsaturated alkyl phenols such as decarboxylated pelandjauic acid [6-(8'-cis-heptadecenyl)salicylic and 6(8'-cis-11'-heptadecadienyl)salicylic acids)] and campnospermanol [3-(2-oxo-9'-cis-nondecenyl)phenol] [see J. H. P. Tyman, *Chem. Soc., Rev.*, 8,499–537 (1979)]. The reagent 3-n-pentadecenyl phenol glycidyl ether is a product made from the reaction of cashew nut shell liquid and epichlorohydrin. Cashew nut shell liquid is a vesicant oil comprising cardanols, cardols and anacardic acid. The reagent 3-n-pentadecenyl phenol glycidyl ether is commercially available by the Cardolite Corporation, Newark, N.J. as CARDOLITE™ NC-513 and NC-513LC and comprises a mixture of saturated, mono-, di-, and tri-unsaturated linear 3-pentadecenyl phenol glycidyl ethers.

The substitution level of the hydrophobic substituent on the cellulose ether is typically from about 0.001 to 0.1, preferably from about 0.004 to about 0.05, and more preferably from about 0.005 to about 0.012 moles of the hydrophobic substituent per mole of cellulose ether. More than one particular hydrophobic substituent can be substituted onto the cellulose ether provided that the total substitution level is within the desired range.

The ionic character of the hydrophobically modified cellulose ethers of the present invention is not critical. It is typically preferred however that the ionic charge be anionic and more preferably nonionic. Cationic cellulose ethers are often undesirable in latex compositions since they can cause agglomeration and flocculation with anionic ingredients, e.g., anionic polyacrylate dispersants, anionic maleic acid copolymer dispersants, and sodium sulfosuccinate surfactants often found in latex compositions. Further details concerning the substituents and methods for modifiying the ionic character of cellulose ethers are known to those skilled in the art.

The cellulose ether derivatives of the present invention are water-soluble. As used herein, the term "water-soluble" means that at least 1 gram, and preferably at least 2 grams of the cellulose ether derivative are soluble in 100 grams of distilled water at 25° C. and 1 atmosphere. The extent of water-solubility can be varied by adjusting the extent of ether substitution on the cellulose ether and by adjusting the substitution level of the hydrophobic substituent. Techniques for varying the water solubility of cellulose ethers are known to those skilled in the art.

The cellulose ether derivatives of the present invention have a variety of end-use applications, such as, for example, industrial applications and personal care applications. Typical industrial applications include for example, use as viscosity adjusters, suspension aids, oil field drilling and fracturing materials, adhesion promotion to siliceous substrates, e.g., glass panels and ceramics, and coating materials for plastic and metal substrates. Typical personal care applications include for example, pharmaceutical and cosmetic compositions, such as, for example, ointments, skin creams, lotions, soaps, shampoos, conditioners, and the like.

A preferred end-use application for cellulose ether derivatives of the present invention is as an additive in latex compositions.

Typical latex compositions comprise as essential components: water; latex polymer; and the cellulose ether. The kind and amount of latex polymer is not critical, and may be provided based on well established procedures. Typical latex polymers include, but are not limited to, various types such as the following: acrylics; alkyds; celluloses; coumarone-indenes; epoxys, esters; hydrocarbons; maleics' melamines; natural resins; oleo resins; phenolics; polyamides; polyesters; rosins; silicones; styrenes; terpenes; ureas; urethanes; vinyls; vinyl acrylics; and the like. Illustrative latex polymers include, but are not limited to, one or more homo- or copolymers containing one or more of the following monomers: (meth)acrylates; vinyl acetate; styrene; ethylene; vinyl chloride; butadiene; vinylidene chloride; vinyl versatate; vinyl propionate; t-butyl acrylate; acrylonitrile; neoprene; maleates; fumarates; and the like, including plasticized or other derivatives thereof.

The amount of cellulose ether which may be used in the latex composition is not narrowly critical. In the broadest sense, the amount of cellulose ether is that which is an effective amount in promoting crosslinking while preferably providing the desired thickening and rheological properties to the latex composition. Typically, the amount of cellulose ether is at least about 0.05, preferably from about 0.15 to about 3, and more preferably from about 0.25 to about 1.5 weight percent of the latex composition.

The selection and amount of latex polymer used in the latex composition can be determined by those skilled in the art is not critical. Typically, the amount of dry latex polymer is at least about 1, preferably from about 2 to about 50, and most preferably from about 3 to about 40 weight percent of the total latex composition.

The latex composition may optionally contain other components such as those generally used in latex compositions. Typical components include, but are not limited to, one or more of the following: solvents such as aliphatic or aromatic hydrocarbons, alcohols, esters, ketones, glycols, glycol ethers, nitroparaffins or the like; pigments; fillers, dryers, flatting agents; plasticizers; stabilizers; dispersants; surfactants; viscosifiers including other polymeric additives, cellulose ether based thickeners and so on; suspension agents; flow control agents; defoamers; anti-skinning agents; preseratives; extenders; filming aids; other crosslinkers; surface improvers; corrosion inhibitors; and other ingredients useful in latex compositions.

Further details concerning the preparation of latex compositions are known to those skilled in the art.

The following examples are provided illustrative purposes and are not intended to limit the scope of the claims which follow. Unless stated otherwise, all percentages correspond to weight percent.

EXAMPLES

The designations and abbreviations used in the examples are defined as follows:

| | |
|---|---|
| Wood pulp: | Cellunier ™ F-LD and Cellunier ™ F-LV wood pulp sheets available from ITT Rayonier, Stamford, CT, and flocked in the laboratory by techniques known in the art. |
| Ethylene oxide: | Obtained from Praxair, Inc., Danbury, CT, distilled under nitrogen before use. |
| PDPGE | 3-n-Pentadecenyl phenyl glycidyl ether containing a mixture of isomers having mono-, di- and tri-unsaturated alkyl groups available from Cardolite Corporation, Newark, NJ, as CARDOLITE ® NC-513 and NC-513LC. |
| Dodecyl phenyl glycidyl ether | An experimental product obtained from Shell Chemicals, Houston, TX. |
| TERGITOL ® NP-7 surfactant | A nonyl phenol ethoxylate non-ionic surfactant, available from Union Carbide, Danbury, CT. |
| TAMOL ® 731 DISPERSANT | An anionic polymer dispersant, available from Rohm & Haas, Philadelphia, PA. |
| KTPP | Potassium tripolyphosphate, available from FMC, Philadelphia, PA. |
| TERGITOL ® NP-10 | A nonyl phenol ethoxylate non-ionic surfactant, available from Union Carbide, Danbury, CT. |
| COLLOIDS ® 643 antifoam | A silica/petroleum dispersion, available from Rhone-Poulenc, Kennesaw, GA. |
| AMP-95 | 2-Amino-2-methyl-1-propanol, available from Angus Chemical Company, Buffalo Grove, IL. |
| TI-PURE ® R-931 rutile | Titanium dioxide (rutile), available from DuPont, Wilmington, DE. |
| SATINTONE #1 calcined clay | An aluminum silicate, available from Engelhard Industries, Edison, NJ. |
| SNOWFLAKE WHITE ® calcium carbonate | Calcium carbonate, available from ECC America, Sylacauga, AL. |
| UCAR ® vinyl-acrylic latex | A vinyl acetate/butyl acrylate copolymer latex, available from UCARO Emulsion Systems, Cary, NC. |
| UCAR ® Filmer IBT | 2,2,4-Trimethyl-1,3-pentanediol monoisobutyrate, available from Union Carbide, Danbury, CT. |
| TRITON ® GR-7M surfactant | A sodium sulfosuccinate anionic surfactant, available from Union Carbide, Danbury, CT. |
| TAMOL ® 960 Dispersant | An anionic polymer dispersant, available from Rohm & Haas, Philadelphia, PA. |
| NOPCO ® NXZ antifoam | A silica/mineral oil dispersion, available from Henkel Corporation, Amber, PA. |
| TRITON ® CF-10 surfactant | A alkylaryl polyether nonionic surfactant, available from Union Carbide, Danbury, CT. |
| TI-PURE ® R-902, Rutile | Titanium dioxide (rutile), available from DuPont, Wilmington, DE. |
| ATTAGEL ® 50 clay | Attapulgite clay, available from Engelhard Industries, Edison, NJ. |
| RHOPLEX ® all-acrylic latex (60%) | An acrylate ester copolymer latex available from Rohm & Haas, Philadelphia, PA. |
| SKANE ® M-8 biocide | 2-n-Octyl-4-isothiazolin-3-one, EPA registry 707-100-AA, available from Rohm & Haas, Philadelphia, PA. |
| NUOSEPT ® 95 biocide | A bicyclic oxazolidine, EPA registry 1100-82, available from Huls America, Piscataway, NJ. |
| COLLOID ® 270 dispersant | An anionic polymer dispersant, available from Rhone-Poulenc, Kennesaw, GA. |
| COLLOID ® 640 antifoam | A silica/petroleum dispersion, available from Rhone-Poulenc, Kennesaw, GA. |
| TRONOX ® CR-813 rutile | Titanium dioxide (rutile), available from Kerr-McGee Company, Oklahoma City, OK. |
| MINEX ® 4 Nepheline | Nepheline syenite, available from Unimin Canada |

| | |
|---|---|
| Syenite | Ltd., Havelock, Ontario. |
| NYTAL ® 300 Talc | A calcium magnesium silicate mineral, available from R. T. Vanderbilt Company, Norwalk, CT. |
| UCAR ® Latex 625 (50% solids) | An acrylate ester copolymer latex, available from UCAR ® Emulsion Systems, Cary, NC. |
| TRITON ® Surfactant CA | A nonyl phenol/octyl phenol ethoxylate mixture, available from Union Carbide, Danbury, CT. |
| NOPCOCIDE ® N-96 mildewcide | 2,4.5.6-Tetrachloroisophthalonitrile, EPA registry 2204-12, available from Henkel Corporation, Ambler, PA. |
| NATROSOL ® Plus 330 | A linear hexadecyl modified hydroxyethyl cellulose having an EO MS of about 3.5 and a DS of about 0.01 available from Aqualon Company, Wilmington, DE. |
| NATROSOL ® Plus 430 | A linear hexadecyl modified hydroxyethyl cellulose having an EO MS of about 3.5 and a DS of about 0.01 available from Aqualon Company, Wilmington, DE. |
| BERMOCOLL ® EHM-100 | A nonyl phenol ethoxylate glycidyl ether modified ethyl hydroxyethyl cellulose which contains a poly(ethylene glycol) spacer group between the hydrophobic moiety and the linking group to the polysaccharide backbone having an EO MS of about 2 and a DS of about 0.024 available from Berol Nobel AB, Stenungsund, Sweden. |

The following test procedures describe the characterization of the polysaccharides with hydrophobes, and define the performance tests used in their evaluation.

EO MS: The molar substitution of EO ethylene oxide in the polysaccharides is determined from the mass gain of the product, corrected for ash and volatiles. EO MS is given by:

$$EO\ MS = \frac{Mf - 30.0}{44.0} \times \frac{162}{30}$$

where Mf is the total mass of product, corrected for ash and volatiles.

DS: Approximately 0.2 g of the polysaccharide (weighed to the nearest 0.1 mg, recorded as m, and corrected for volatiles and ash) is dissolved in water containing 0.5 g of aqueous sodium dodecyl sulfate (sodium lauryl sulfate, SLS) and diluted to 50.00 ml. The ultraviolet spectrum from 300 to 240 nm is recorded, and the absorbance at 278 nm is recorded as A (corrected for the baseline, e=1530M$^{-1}$ cm$^{-1}$). The EO MS is given by y, so that the DS is given by:

$$DS = \frac{50.00 \times (162 + 44 \times y) \times A}{1530 \times 1000 \times m}$$

1% Viscosity: Viscosity, in centipoise, of an aqueous solution of the polysaccharide at 1% measured using a Brookfield viscometer, model LVT, spindle #2, at 30 rpm and 25° C. This procedure is based on ASTM Method D 2364-89.

Stormer viscosity: ASTM Method D 562-81.

ICI viscosity: Viscosity, in poise, measured on the final latex paint formulation using an ICI Cone and Plate Viscometer, Model VR-4000. ASTM Method D 4287-88.

Sag resistance: ASTM Method D 4400-84.

Leveling: ASTM Method D 4062-81.

Spatter resistance: ASTM Method D 4707-87.

Efficiency: The percent of the alkyl phenyl glycidyl ether (hydrophobe glycidyl ether) charged in the reaction that is incorporated in the final HMHEC polymer (the glycidyl ether reaction efficiency).

APGE/C: The weight ratio of the alkyl phenyl glycidyl ether (PDPGE, DPGE, etc.) and the cellulose charge, corrected for inerts.

EXAMPLE 1

PREPARATION OF UNSATURATED 3-n-PENTADECENYL PHENYL GLYCIDYL ETHER-MODIFIED HYDROXYETHYL CELLULOSE

A three pint, glass Chemco™ pressure reactor was charged with 30.80 grams ("g") of Cellunier™ F-LD wood pulp (30.00 g contained), 338.2 g of t-butyl alcohol, 12.2 g of acetone and 54.7 g of distilled water. The mixture was stirred for one hour while purging the headspace of the reactor with nitrogen at a rate of 500 ml/min to remove any entrained oxygen. The reactor was fitted with an ice water condenser to prevent evaporative losses of the diluent during the nitrogen purge. After 30 minutes of purging, the slurry was warmed to 32° C. using a water bath.

After purging for one hour and while holding at 32° C., 22.5 g of 32 wt. % (by weight) aqueous sodium hydroxide solution (14.40 g of 50 wt. % aqueous sodium hydroxide in 8.10 g of water) were added to the slurry by syringe, and the slurry exothermed from 32° C. to 35° C. The slurry was stirred for one hour at 35° C., while continuing the nitrogen headspace purge.

The first charge of freshly distilled ethylene oxide (33.6 g) was added to the reactor, and with continuous stirring, the reactor was sealed. The slurry was heated with a water bath to 75° C. (typical heat-up time is 35 minutes). The timing of the ethoxylation reaction was begun at the onset of 75° C.. Thirty minutes after reaching 75° C., the second charge of ethylene oxide (9.6 g) was added to the reactor, and the reaction was continued at 75° C. for 1.5 hours.

After a total of 2 hours at 75° C., 3.56 g of PDPGE (equivalent epoxide weight of 424) were added to the reactor by syringe, and 10 milliliters ("ml") of nitrogen-purged acetone was taken up into the syringe and added to the reactor through the injection port to rinse the port and syringe. The slurry was then heated from 75° to 85° C. (typical heat-up time is 10 minutes) and held at 85° C. for three hours.

The slurry was cooled to room temperature and 11.4 g of glacial acetic acid were added by syringe, followed by 200 ml of acetone. After stirring for 15 minutes, the polymer was collected by vacuum filtration through a fritted metal Buchner funnel. The polymer was washed in a Waring blender four times with 500 ml of 7:1 (by volume) acetone/water, twice with 500 ml of 5:1 acetone/water, and twice with 500 ml of pure acetone. In the second pure acetone wash, 1.00 g of 40% aqueous glyoxal and 2.00 g of glacial acetic acid was included in the acetone wash to surface-treat the polymer. The polymer was dried overnight in vacuo at 50° C., affording 64.00 g of an off-white granular solid (Sample "S8"). The ash content was found to be 7.9% (as sodium acetate), and the mass gain EO MS was found to be 3.5. The pentadecenyl phenoxy DS was found to be 0.006 by ultraviolet spectroscopy (extinction coefficient=$1598M^{-1}$, $cm^{-1}$), and the 1% corrected viscosity was found to be 246 centipoise ("cp") cP (Brookfield LVT, spindle #3, 30 rpm).

CONTROL EXAMPLE 2

PREPARATION OF SATURATED
3-n-PENTADECYL PHENYL GLYCIDYL ETHER

A 250 ml, three-necked round bottomed flask was fitted with a stirring paddle and thermometer. The flask was charged with 40 ml of 50 wt. % aqueous sodium hydroxide solution, 25 ml of epichlorohydrin, and 0.84 g of tetrabutylammonium hydrogen sulfate. While stirring the mixture at high speed, 16.48 g (54 millimoles) of 3-n-pentadecyl phenol were added as a solid. The temperature in the flask did not exceed 25° C., and no external cooling was required.

As the reaction progressed, the mixture became significantly thicker, so 75 ml of epichlorohydrin and 50 ml of acetonitrile were added to render the mixture fluid enough for vigorous stirring. The mixture was stirred for twelve hours and allowed to stand overnight.

The reaction mixture consisted of two phases: an amber fluid and a white precipitate which was identified as sodium chloride. The reaction mixture was diluted with 300 ml of distilled water, dissolving most of the solid. The liquid was decanted from the remaining insoluble solid and extracted with diethyl ether (two times with 150 ml each time). The ether layers were combined and washed three times with saturated sodium chloride solution, once with dilute hydrochloric acid, and three times with water. The pH of the third water wash was measured using Universal pH paper and was found to be 6. The ether layer was dried overnight over magnesium sulfate.

Removal of the drying agent by filtration, followed by rotary evaporation to remove the ether afforded 22.97 g of an amber oil, which solidified on standing. The solid was partly soluble in methanol, but an attempt to recrystallize the solid from methanol was not successful. A portion of the white solid was recovered from the methanol and dried in vacuo (11.70 g, 60%). Nuclear Magnetic Resonance ("NMR") spectroscopy confirmed the structure as saturated 3-n-pentadecyl phenyl glycidyl ether (PDPGEs), and the equivalent epoxide weight was found to be 367 (98 wt. % pure).

EXAMPLE 3

PREPARATION OF UNSATURATED
3-n-PENTADECENYL PHENYL GLYCIDYL
ETHER-MODIFIED HYDROXYETHYL
CELLULOSE

Various samples (S1, S2, S3, S4, S5, S6, S7, S9, S10, S11) were prepared using the procedure set forth in Example 1. The characteristics of the samples from Examples 1, 2, and 3 are set forth in Table 1 below. Samples S4, S9, and S10 were prepared using Cellunier™ F-LV wood pulp.

TABLE 1

PROPERTIES OF ALKYL PHENYL GLYCIDYL ETHER-MODIFIED HYDROXYETHYL CELLULOSE POLYMERS

| Sample Number | Charge | APGE/C | Efficiency | DS | EOMS | 1% Viscosity |
|---|---|---|---|---|---|---|
| S1 | 5.60 g | 0.168 | 10.5% | 0.008 | 3.52 | 1820 cP |
| S2 | 7.75 g | 0.233 | 11.0% | 0.012 | 3.50 | insoluble |
| S3 | 3.45 g | 0.104 | 10.8% | 0.005 | 3.47 | 105 cp |
| S4 | 5.60 g | 0.168 | 10.5% | 0.008 | 2.65 | 18 cP |
| S5 | 4.65 g | 0.134 | 9.5% | 0.006 | 3.68 | 1176 cP |
| S6 | 4.25 g | 0.123 | 10.4% | 0.006 | 3.66 | 775 cP |
| S7 | 4.35 g | 0.123 | 14.3% | 0.008 | 3.54 | 1368 cP |
| S8 | 3.56 g | 0.101 | 14.3% | 0.006 | 3.50 | 246 cP |
| S9 | 4.35 g | 0.123 | 16.8% | 0.009 | 2.98 | 20 cP |
| S10 | 3.56 g | 0.101 | 17.5% | 0.008 | 2.91 | 14 cP |
| CS11 | 4.00 g | 0.133 | 10.0% | 0.006 | 3.57 | 617 cP |

CONTROL EXAMPLE 4 PREPARATION OF
SATURATED DODECYLPHENYL GLYCIDYL
ETHER-MODIFIED HYDROXYETHYL
CELLULOSE

A three pint, glass Chemco™ pressure reactor was charged with 31.33 g of Cellunier™ F-LD wood pulp (30.00 g contained), 338.2 g of t-butyl alcohol, 12.2 g of acetone, and 54.7 g of distilled water. The mixture was stirred for one hour while purging the headspace of the reactor with nitrogen at a rate of 500 ml/min to remove any entrained oxygen. The reactor should be fitted with an ice water condenser to prevent evaporative losses of the diluent during the nitrogen purge. After 30 minutes of purging, the slurry is warmed to 32° C. using a water bath. After purging for one hour and while holding at 32° C., 22.5 g of 32% (by weight) aqueous sodium hydroxide solution (14.40 g of 50% aqueous sodium hydroxide in 8.10 g of water) were added to the slurry by syringe, and the slurry exothermed from 32° C. to 35° C.. The slurry was stirred for one hour at 35° C., while continuing the nitrogen headspace purge.

The first charge of freshly distilled ethylene oxide (33.6 g) was added to the reactor, and with continuous stirring, the reactor was sealed. The slurry was heated with a water bath to 75° C. (typical heat-up time is 35 minutes). The timing of the ethoxylation reaction was begun at the onset of 75° C. Thirty minutes after reaching 75° C., the second charge of ethylene oxide (9.6 g) was added to the reactor, and the reaction was continued at 75° C. for 1.5 hours.

After a total of 2 hours at 75° C., 4.10 g of dodecyl phenyl glycidyl ether (equivalent epoxide weight of 352) were added to the reactor by syringe, and 10 ml of nitrogen-purged acetone is taken up into the syringe and added to the reactor through the injection port to rinse the port and syringe of residual dodecyl phenyl glycidyl ether. The slurry was then heated from 75 to 85° C. (typical heat-up time is 20 minutes) and held at 85° C. for three hours.

The slurry was cooled to room temperature and 11.4 g of glacial acetic acid were added by syringe, followed by 200 ml of acetone. After stirring for 15 minutes, the polymer was collected by vacuum filtration through a fritted metal Buchner funnel. The polymer was washed in a Waring blender four times with 500 ml of 7:1 (by volume) acetone/water, twice with 500 ml of 5:1 acetone/water, and twice with 500 ml of pure acetone. In the second pure acetone wash, 1.00 g of 40% aqueous glyoxal and 2.00 g of glacial acetic acid was included in the acetone wash to surface-treat the polymer. The polymer was dried overnight in vacuo at 50° C., affording 64.8 g of an off-white granular solid (CS12). The ash content was found to be 7.5% (as sodium acetate), and the mass gain EO MS was found to be 3.6. The dodecyl phenoxy DS was found to be 0.012 by ultraviolet spectroscopy (extinction coefficient=1526 $M^{-1}$, $cm^{-1}$), and the 1% corrected viscosity was found to be 224 cP (Brookfield LVT, spindle #3, 30 rpm).

EXAMPLE 5

OXIDATIVE CROSS-LINKING OF POLYSACCHARIDE FILMS

Polymer solutions of 1 wt % or 2 wt % polysaccharide were prepared and approximately 30.0 g of solution were poured into a 9.5×9.5 centimeter ("cm") square polystyrene Petri dish. The Petri dishes were allowed to stand at ambient temperature for several days while the water evaporated. In some polymer solutions, either 6.0% cobalt (II) chloride or 8.0% manganese (II) sulfate monohydrate were added to the solution before casting, with the cobalt (II) chloride or manganese (II) sulfate concentration based on the contained polymer content (0.06 g of $CoCl_2$ or 0.08 g of MnSO4 in 50 ml of 2 wt % aqueous polymer solution). Removal of the dry films from the Petri dishes afforded films with a thickness of about 1 mil.

For solubility testing, rectangular pieces of film about 2×4 cm were cut, with a typical film weight of between about 0.030 and 0.060 g. These films were immersed in 50 ml of distilled water and stirred with a magnetic stirring bar. Qualitative assessments of the solubility and cohesiveness of the films were noted at 30 and 200 minutes.

The results of the testing are shown in Table 2 below.

TABLE 2

| OXIDATIVE CROSS-LINKING OF POLYSACCHARIDES | | | |
|---|---|---|---|
| SAMPLE FIRST SET 5 DAYS† | CATATLYST* | COLD WATER AFTER 30 MINUTES | SOLUBILITY AFTER 200 MINUTES |
| S1 | None | Film disintegrated | Film swollen & disintegrated |
| S1 | 6.0% $CoCl_2$ | Film fragmented & swollen | Film swollen & disintegrated |
| S1 | 8.0% $MnSO_4$ | Film agglomerated | Film swollen & disintegrated |
| S3 | None | Film intact | Film disintegrated |
| S3 | 6.0% $CoCl_2$ | Film intact on surface of water | Film disintegrated |
| SAMPLE FIRST SET 5 DAYS† | CATATLYST* | COLD WATER AFTER 30 MINUTES | SOLUBILITY AFTER 200 MINUTES |
| S3 | 8.0% $MnSO_4$ | Film disintegrated | Film disintegrated and agglomerated |
| CS12 | None | Film starting to dissolve | Film fully dissolved |
| SAMPLE FIRST SET 16 DAYS† | CATATLYST* | COLD WATER AFTER 30 MINUTES | SOLUBILITY AFTER 200 MINUTES |
| S1 | None | Film fragmented | Film fragmented |
| S1 | 6.0% $CoCl_2$ | Film intact | Film fragmented |
| S1 | 8.0% $MnSO_4$ | Film fragmented | Film fragmented |
| S3 | None | Film disintegrated | Film disintegrated |
| S3 | 6.0% $CoCl_2$ | Film disintegrated | Film disintegrated |
| S3 | 8.0% $MnSO_4$ | Film disintegrated | Film disintegrated |
| CS12 | None | Film dissolving | Film dissolved |
| SAMPLE SECOND SET 12 DAYS† | CATATLYST* | COLD WATER AFTER 30 MINUTES | SOLUBILITY AFTER 200 MINUTES |
| S1 | None | Film intact | Film disintegrated |
| S1 | 6.0% $CoCl_2$ | Film disintegrated | Film disintegrated |
| S1 | 8.0% $MnSO_4$ | Film disintegrated | Film disintegrated |
| S3 | None | Film intact | Film disintegrated |
| S3 | 6.0% $CoCl_2$ | Film fragmented | Film |

TABLE 2-continued

OXIDATIVE CROSS-LINKING OF POLYSACCHARIDES

| | | | fragmented |
|---|---|---|---|
| S3 | 8.0% $MnSO_4$ | Film disintegrated | Film disintegrated |
| CS12 | None | Film intact | Film dissolved |
| CS12 | 6.0% $CoCl_2$ | Film disintegrated | Film dissolved |
| CS12 | 8.0% $MnSO_4$ | Film disintegrated | Film dissolved |
| NATROSOL ® Plus 330 | None | Film fragmented | Film dissolved |

| SAMPLE SECOND SET 12 DAYS† | CATATLYST* | COLD WATER AFTER 30 MINUTES | SOLUBILITY AFTER 200 MINUTES |
|---|---|---|---|
| S1 | None | Film fragmented | Film fragmented |
| S1 | 6.0% $CoCl_2$ | Film intact | Film fragmented |
| S1 | 8.0% $MnSO_4$ | Film fragmented | Film fragmented |
| S3 | None | Film disintegrated | Film disintegrated |
| S3 | 6.0% $CoCl_2$ | Film disintegrated | Film disintegrated |
| S3 | 8.0% $MnSO_4$ | Film disintegrated | Film disintegrated |
| CS12 | None | Film dissolving | Film dissolved |

| SAMPLE THIRD SET 7 DAYS† | CATATLYST* | COLD WATER AFTER 30 MINUTES | SOLUBILITY AFTER 200 MINUTES |
|---|---|---|---|
| S1 | None | Film intact | Film fragmented |
| S1 | 6.0% $CoCl_2$ | Film intact | Film fragmented |
| S1 | 8.0% $MnSO_4$ | Film intact | Film fragmented |
| CS11 | None | Film intact | Film dissolved |
| CS11 | 6.0% $CoCl_2$ | Film dissolving | Film dissolved |
| CS11 | 8.0% $MnSO_4$ | Film fragmented | Film dissolved |

*Catalyst concentration based on contained HMHEC polymer, expressed in weight percent.
†Elapsed time from casting polymer solution to solubility testing.
Fragmentation of film implies the breaking-up of the film into large pieces.
Disintegration is the further fragmentation into small, peptized pieces that still fail to dissolve.
Dissolution indicates the solubilization of the film in water.

The data presented in Table 2 demonstrates that quite surprisingly, the films made with the unsaturated polysaccharides of the present invention did not dissolve after stirring in water for 200 minutes. Films which remained fragmented or which disintegrated were water insoluble.

This water-insolubility is clear evidence of cross-linking of the film, presumably by oxidative crosslinking. In contrast, DPGE-modified polysaccharides, i.e., CS12 and NATROSOL® Plus 330, which contained saturated alkyl hydrophobic groups, completely dissolved after 200 minutes in water. The importance of unsaturated groups in the alkyl side chains of the hydrophobes of the present invention was further illustrated in the film behavior of saturated PDPGE-modified polymer CS11. Unlike the unsaturated PDPGE-modified polymers prepared with PDPGE which contained unsaturated alkyl groups, polymer CS11 which contained saturated $C_{15}$ alkyl phenolic groups readily dissolved in water. This demonstrates, quite surprisingly, that in the absence of alkyl unsaturation, the polysaccharides do not cross-link on air drying. Thus, the potential utility of these novel unsaturated PDPGE-modified polysaccharides in the formation of water-insoluble coatings is demonstrated.

Polymer films of another commercially available product, BERMOCOLL® EHM-100 also exhibited lower water solubility after air drying, and these films tended to be opaque. As noted above, this commercial product contains a poly(ethylene glycol) spacer group between the saturated hydrophobic moiety and the linking group to the polysaccharide backbone. However, it is known to those skilled in the art, that such polysaccharides have limited water solubility which decreases with increasing temperature. The reduced water solubility of these films is likely an artifact of their inherently limited water-solubility and has nothing whatsoever to do with crosslinking.

EXAMPLE 6

PREPARATION OF LATEX PAINTS

Three latex paint formulations were made by standard procedures known to those skilled in the art.

The paints had the following compositions.

| PAINT A | |
|---|---|
| PIGMENT GRIND | MASS (GRAMS) |
| Water | 100.0 |
| TAMOL ® 731 dispersant | 4.2 |
| KTPP | 0.25 |
| TERGITOL ® NP-10 nonyl phenol ethoxylate | 1.0 |
| COLLOIDS ® 643 antifoam | 1.25 |
| NUOSEPT ® 95 biocide | 1.0 |
| Cellulosic thickener | 3.0 |
| AMP-95 | 0.5 |
| Water | 70.0 |

PAINT A

| PIGMENT GRIND | MASS (GRAMS) |
| --- | --- |
| Mix for 5 minutes | |
| Propylene glycol | 9.0 |
| TI-PURE ® R-931 rutile | 75 |
| SATINTONE ® #1 calcined clay | 62.5 |
| SNOWFLAKE WHITE ® calcium carbonate | 100 |
| Water | 10.0 |
| Grind for 30 minutes | |
| Let-Down | |
| UCAR ® vinyl-acrylic latex | 112.5 |
| UCAR ® Filmer IBT | 6.0 |
| TRITON ® GR-7M surfactant | 0.5 |
| COLLOIDS ® 643 antifoam | 1.25 |
| Water | 20.0 |
| Total | 577.95 g |

PAINT B
EXTERIOR ACRYLIC TINT BASE

| PIGMENT GRIND | MASS (GRAMS) |
| --- | --- |
| Premixed thickener | 1.8 |
| Propylene glycol | 10.0 |
| TAMOL ® 960 dispersant | 3.95 |
| KTPP | 0.75 |
| NOPCO ® NXZ antifoam | 0.5 |
| TRITON ® CF-10 surfactant | 1.25 |
| Water | 79 |
| TI-PURE ® R-902 Rutile | 85 |
| Zinc oxide | 25 |
| Silica, Silver Bond B ® | 104 |
| Grind for 5 minutes | |
| ATTAGEL ® 50 clay | 5.0 |
| Grind for 10–15 minutes | |
| Let-Down | |
| RHOPLEX ® all-acrylic latex (60%) | 185 |
| NOPCO ® NXZ antifoam | 1.0 |
| UCAR ® Filmer IBT | 6.7 |
| Propylene glycol | 24 |
| SKANE ® M-8 biocide | 1.0 |
| 2.5% slurry of cellulosic thickener and water | 50.25 |
| Total | 584.2 g |

PAINT C
ALL ACRYLIC FLAT

| PIGMENT GRIND | MASS (GRAMS) |
| --- | --- |
| Water | 150.6 |
| Thickener | 3.00 |
| NUOSEPT ® 95 biocide | 1.15 |
| COLLOID ® 270 dispersant | 3.85 |
| COLLOID ® 640 antifoam | 0.95 |
| TERGITOL ® NP-10 | 1.05 |
| Propylene glycol | 12.95 |
| TRONOX ® CR-813 rutile | 112.5 |
| MINEX ® 4 Nepheline Syenite | 50.0 |
| NYTAL ® 300 Talc | 50.0 |
| Let-Down | |
| UCAR ® Latex 625 (50% solids) | 178.6 |
| UCAR ® Famer IBT | 4.45 |
| COLLOID ® 640 antifoam | 0.95 |
| Water | 4.5 |
| NOPCOCIDE ® N-96 mildewcide | 3.0 |
| TRITON ® surfactant CA | 1.05 |
| Ammonium hydroxide, 28% | 0.45 |
| Total | 579.05 g |

The paints were formulated with various samples described above and commercially available additives or thickeners. The paints were then tested for Stormer Viscosity, ICI Viscosity, Sag, Leveling and Spatter Resistance as described above, The results of the tests are shown in Tables 3, 4 and 5.

TABLE 3

COMPARISON OF INTERIOR VINYL-ACRYLIC FLAT (PAINT A)

| THICKENER | THICKENER VISCOSITY | STORMER VISCOSITY | ICI VISCOSITY | SAG | LEVELING | SPATTER RESISTANCE |
| --- | --- | --- | --- | --- | --- | --- |
| S1 | 1820 cP | 115 KU | 1.2 P | 20 | 2 | 9 |
| S3 | 105 cP | 86 KU | 1.2 P | 17 | 3 | 8 |
| S5 | 1176 cP | 86 KU | 0.9 P | 18 | 2 | 9 |
| S5 | 1176 cP | 110 KU | 1.2 P | 20 | 2 | 9 |
| S7 | 1368 cP | 103 KU | 1.2 P | 20 | 2 | 9 |
| S8 | 246 cP | 89 KU | 1.3 P | 19 | 1 | 8 |
| CS11 | 617 cP | 97 KU | 0.9 P | 18 | 2 | 8 |
| BERMOCOLL EHM-100 | 225 cP | 83 KU | 1.4 P | 19 | 3 | 5 |
| NATROSOL Plus 330 | 400 cP | 94 KU | 1.6 P | 16 | 3 | 8 |
| NATROSOL Plus 430 | 1600 cP | 98 KU | 1.5 p | 21 | 2 | 9 |

TABLE 4

| | | COMPARISON OF EXTERIOR FLAT (PAINT B) | | | | |
|---|---|---|---|---|---|---|
| THICKENER | THICKENER VISCOSITY | STORMER VISCOSITY | ICI VISCOSITY | SAG | LEVELING | SPATTER RESISTANCE |
| S1 | 1820 cP | 107 KU | 1.3 P | 21 | 2 | 9 |
| S3 | 105 cP | 104 KU | 1.4 P | 20 | 2 | 9 |
| S5 | 1176 cP | 89 KU | 1.2 P | 20 | 3 | 9 |
| S5 | 1176 cP | 110 KU | 1.4 P | 25 | 2 | 9 |
| S7 | 1368 cP | 100 KU | 1.3 P | 20 | 2 | 8 |
| S8 | 246 cP | 102 KU | 1.4 P | 19 | 2 | 9 |
| BERMOCOLL EHM-100 | 225 cP | 97 KU | 1.3 P | 20 | 3 | 7 |
| NATROSOL Plus 330 | 400 cP | 104 KU | 1.3 P | 16 | 3 | 8 |
| NATROSOL Plus 430 | 1600 cP | 103 KU | 1.3 P | 19.6 | 2 | 7 |

TABLE 5

| | | COMPARISON OF EXTERIOR FLAT (PAINT C) | | | | |
|---|---|---|---|---|---|---|
| THICKENER | THICKENER VISCOSITY | STORMER VISCOSITY | ICI VISCOSITY | SAG | LEVELING | SPATTER RESISTANCE |
| S1 | 105 cP | 95 KU | 1.0 P | 20 | 3 | 8 |
| S5 | 1176 cP | 111 KU | 1.0 p | 36 | 2 | 9 |
| S7 | 1368 cP | 108 KU | 1.0 p | 40 | 2 | 9 |
| S8 | 246 cP | 99 KU | 1.0 p | 30 | 2 | 9 |
| S9 | 20 cP | 77 KU | 0.7 P | 19 | 3 | 7 |
| CS11 | 617 cP | 116 KU | 1.2 P | 35 | 1 | 9 |
| S3 | 15 cP | 74 KU | 0.7 P | 8 | 6 | 6 |

The data set forth above demonstrates that the paint performance parameters of latex paints made with the unsaturated polysaccharides of the present invention are equivalent to, or better than, the performance parameters of paints containing saturated polysaccharides with saturated hydrophobes, including commercially available products. Moreover, when applied as films, latex compositions comprising the unsaturated hydrophobes of the present invention can provide enhanced hardness and durability as compared to films cast from latexes with saturated hydrophobes.

In addition to latex coating compositions comprising only the above-described cellulose ethers, the hydrophobe-modified cellulose ethers of the present invention can also be used as latex paint thickeners in combination with synthetic associative thickeners such as the hydrophobe-modified ethoxylated urethane thickeners (referred to in the art as HEUR thickeners such as ACRYSOL® SCT-270, manufactured by Rohm & Haas) or the hydrophobe-modified alkali-soluble emulsion thickeners (referred to in the art as HASE thickeners such as ACRYSOL® TT-935, manufactured by Rohm & Haas and UCAR® POLYPHOBE® thickeners, manufactured by UCAR® Emulsion Systems, Union Carbide). Used in combination with HEUR or HASE thickeners, the cellulose ethers of the present invention might yield paint films with improved water resistance and film hardness, as well as better weatherability than might be achieved with HEUR or HASE thickeners alone.

Although the present invention has been described with respect to specific aspects, those skilled in the art will recognize that other aspects are intended to be included within the scope of the claims which follow.

For example, other unsaturated alkyl phenolics beside the ones specifically mentioned herein, such as, for example, synthetically prepared unsaturated alkyl phenolics would also be useful as oxidatively cross-linkable hydrophobes.

Moreover, in addition to their utility as thickeners in latex paints, these unsaturated polysaccharides might have utility in other coatings-related applications. The presence of unsaturations in the alkyl side chains of these polysaccharides could provide grafting sites for vinyl and acrylic monomers used in emulsion polymerization to manufacture latexes, i.e., protection colloids.

There has also been technical interest in epoxide-modified drying oils such as epoxidized linseed oil and vernonia oil (a naturally occurring epoxidized vegetable oil) in epoxy thermosets and interpenetrating polymer networks. It may be possible to prepare epoxidized unsaturated hydrophobes or subsequent reaction to a polysaccharide such as hydroxyethyl cellulose to generate an epoxy functionalized polymer, which may have utility in waterborne epoxy coatings.

I claim:

1. A latex composition comprising:
   (i) a latex polymer;
   (ii) a crosslinkable, cellulosic additive comprising a cellulose ether substituted with from about 0.001 to 0.1 mole per mole of cellulose ether of a hydrophobic substituent comprising an alkene portion having from about 4 to 20 carbon atoms and a sufficient amount of unsaturation on said alkene portion to promote crosslinking between molecules of the additive upon exposure to oxygen; and
   (iii) water.

2. A water-based paint formulation comprising:
   a latex polymer;
   (ii) a crosslinkable, cellulosic additive comprising a cellulose ether substituted with from about 0.001 to 0.1 mole per mole of cellulose ether of a hydrophobic substituent comprising an alkene portion having from about 4 to 20 carbon atoms and a sufficient amount of unsaturation on said alkene portion to promote crosslinking between molecules of the additive upon exposure to oxygen; and (iii) a pigment.

3. The composition of claim 1 wherein the alkene portion of the hydrophobic substituent is polyunsaturated.

4. The composition of claim 3 wherein the alkene portion of the hydrophobic substituent is diunsaturated.

5. The composition of claim 3 wherein the alkene portion of the hydrophobic substituent is triunsaturated.

6. The composition of claim 3 wherein the alkene portion of the hydrophobic substituent comprises two unsaturated carbon-carbon bonds which are separated by at least one saturated carbon atom.

7. The composition of claim 1 wherein the additive comprises from about 0.005 to 0.012 mole of the hydrophobic substituent per mole of cellulose ether.

8. The composition of claim 1 wherein the alkene portion of the hydrophobic substituent has from about 4 to 18 carbon atoms, 9. The composition of claim 1 wherein the hydrophobic substituent has an alkene structure.

10. The composition of claim 1 wherein the hydrophobic substituent has an alkene-aryl structure.

11. The composition of claim 10 wherein the hydrophobic substituent is an alkene phenolic having from about 10 to 26 carbon atoms.

12. The composition of claim 1 wherein the hydrophobic substituent is 3-n-pentadecenyl phenyl.

13. A film comprising crosslinked molecules of the composition of claim 1.

14. The water-based paint formulation of claim 2 wherein the latex polymer is an acrylic latex polymer.

15. The water-based paint formulation of claim 2 wherein the latex polymer is an vinyl acrylic latex polymer.

16. The water-based paint formulation of claim 2 wherein the latex polymer is an vinyl latex polymer.

* * * * *